United States Patent [19]

Bartholomew

[11] Patent Number: 5,505,230
[45] Date of Patent: Apr. 9, 1996

[54] MEANS FOR PROTECTING CONDUCTING EQUIPMENT

[75] Inventor: Donald D. Bartholomew, Mt. Clemens, Mich.

[73] Assignee: Proprietary Technology, Inc., Bloomfield Hills, Mich.

[21] Appl. No.: 302,649

[22] PCT Filed: Mar. 19, 1992

[86] PCT No.: PCT/US92/02221

§ 371 Date: Sep. 8, 1994

§ 102(e) Date: Sep. 8, 1994

[87] PCT Pub. No.: WO93/18982

PCT Pub. Date: Sep. 30, 1993

[51] Int. Cl.$^6$ .................................................. F16L 9/00
[52] U.S. Cl. ........................ 138/164; 138/166; 138/167; 138/170
[58] Field of Search ...................... 138/128, 162, 138/164, 165, 166, 167, 168, 171, 170

[56] References Cited

U.S. PATENT DOCUMENTS

| | | | |
|---|---|---|---|
| 1,891,740 | 12/1932 | Westerman | 138/165 |
| 1,895,133 | 1/1933 | Quarnstrom . | |
| 1,984,232 | 12/1934 | Peremi | 138/165 |
| 2,067,665 | 1/1937 | Holt | 138/171 |
| 2,124,004 | 7/1938 | O'Neil . | |
| 3,040,781 | 6/1962 | Reymann et al. . | |
| 3,181,302 | 5/1965 | Lindsay . | |
| 3,193,432 | 7/1965 | Baines . | |
| 3,380,481 | 4/1968 | Kraus | 138/166 |
| 3,456,449 | 7/1969 | Heil . | |
| 3,459,234 | 8/1969 | Richter | 138/165 |
| 3,517,702 | 6/1970 | Mueller . | |
| 3,587,657 | 6/1971 | Staller | 138/166 |
| 3,625,259 | 12/1971 | Kennedy, Jr. et al. . | |
| 3,656,514 | 4/1972 | Kafka | 138/171 |
| 3,682,434 | 8/1972 | Boenig | 138/165 |
| 3,906,126 | 9/1975 | Kaiser et al. . | |
| 3,921,847 | 11/1975 | Rentmeester . | |
| 4,164,243 | 8/1979 | Cookson | 138/164 |
| 4,218,814 | 8/1980 | Hodapp | 138/166 |
| 4,422,478 | 12/1983 | Pentney | 138/168 |
| 4,513,787 | 4/1985 | Hegler et al. . | |
| 4,532,168 | 7/1985 | Steele | 138/167 |
| 4,535,197 | 8/1985 | Butler | 138/166 |
| 4,605,043 | 8/1986 | Grenier | 138/168 |
| 4,635,294 | 1/1987 | Bentsen | 138/162 |
| 4,713,272 | 12/1987 | Bachel et al. . | |
| 4,721,410 | 1/1988 | Recalde . | |
| 4,758,115 | 7/1988 | Shishkin et al. . | |
| 4,830,061 | 5/1989 | Karakawa | 138/168 |
| 4,865,893 | 9/1989 | Kunze | 138/166 |
| 4,896,997 | 1/1990 | Gaylin . | |
| 4,944,976 | 7/1990 | Plummer, III . | |
| 4,967,800 | 11/1990 | Heilmayr | 138/166 |
| 5,134,250 | 7/1992 | Caveney | 138/165 |

FOREIGN PATENT DOCUMENTS

| | | | |
|---|---|---|---|
| 2832400 | 2/1980 | Germany | 138/166 |
| 2900796 | 7/1980 | Germany | 138/166 |
| 206564 | 8/1966 | Sweden | 138/165 |
| 1589475 | 5/1981 | United Kingdom | 138/166 |
| 9318982 | 9/1993 | WIPO . | |

Primary Examiner—David Scherbel
Assistant Examiner—Randall E. Chin
Attorney, Agent, or Firm—Harness, Dickey & Pierce

[57] ABSTRACT

A protective sleeve assembly 10 for use in protecting conducting equipment such as cables, wiring and tubing is disclosed as comprising a longitudinal body portion 12 which includes an inner surface 16 and an outer surface 14, a male locking member 18 extending from one longitudinal edge of the longitudinal body portion and a female locking member 32 extending from a second longitudinal edge of the longitudinal body portion. The protective sleeve is selectively closeable by connecting the male and female locking members 18 and 32, respectively. An elastomeric sealing material 52 can be provided between the male and female locking members to assist in providing a fluid resistant seal.

3 Claims, 1 Drawing Sheet

MEANS FOR PROTECTING CONDUCTING EQUIPMENT

BACKGROUND OF THE INVENTION

1. Field of the Invention

The invention relates to a protective sleeve for enclosing lengths of electrical and E & M conducting devices, such as cables, wiring, and tubing, and more particularly, to a one piece plastic sleeve having male and female locking members located along first and second longitudinal edges which allow the plastic sleeve to be closed by inserting the male member within the female member.

2. Description of Related Art

Many protective tubular enclosures having longitudinal points of attachment are known. Generally, the tubular enclosures are sheets of material wrapped around elongated objects such as wiring, cables, or other forms of tubing which are closed along the longitudinal edges to provide a sealed environment for the object or objects contained therein. For example, U.S. Pat. Nos. 1,895,133 to Quarnstrom; 2,067,665 to Holt; 3,625,259 to Kennedy; 4,513,787 to Hegler; and 4,944,976 to Plumer all disclose various designs of tubular enclosures, however, each of the above-mentioned patents fall short of the advantages offered by the present invention.

The tubular enclosures presently available do not include separate sealing means for preventing the introduction of undesirable elements such as soil or water into the protective sleeve over an emended period of time. Further, the sealing means of the present invention can be attached to the protective sleeve after the object or objects to be contained have been inserted into the protective sleeve.

The invention provides a protective sleeve having increased tubular strength for spooling the sleeve onto a reel to facilitate transportation of the sleeve. The sleeve is extruded in the form of a closed conduit and has an outwardly projecting female locking member. The sleeve is slit longitudinally to allow for the insertion of object or objects and once the object or objects have been inserted, the edge of the sleeve distal to the female locking member is inserted into the gap provided by the female locking member. The distal edge and the female locking member are then sealed together.

Accordingly, it is the primary object of the present invention to provide a protective sleeve which incorporates sealing means which preclude the introduction of undesired elements such as soil and water.

It is another object of the present invention to provide a protective sleeve which allows for the introduction of sealing means after the object or objects to be contained have been inserted into the protective sleeve and just prior to closing the structure.

It is another object of the present invention to provide a protective sleeve which is selectively openable and closeable.

It is another object to provide a protective sleeve which can be slit open prior to inserting the object or objects to be contained and resealed once the object or objects have been inserted.

SUMMARY OF THE INVENTION

To achieve the foregoing objects, the present invention provides a protective sleeve assembly which generally comprises a single piece of plastic having a longitudinal body which includes an inner surface, an outer surface, a male locking member along a first longitudinal edge and a mating female locking member located along a second longitudinal edge. The protective sleeve is made of a relatively deformable plastic which allows for deformation of the sleeve without damaging the contents of the sleeve. The male locking member typically includes a first enlarged diameter portion and a second reduced diameter portion. Located at a first end upon the second diameter portion is an outwardly projecting longitudinal flange which includes a blocking wall disposed relatively perpendicular to the outer surface of the second diameter portion and a mating wall adjoining the blocking wall which is disposed substantially parallel to the outer surface of the second diameter portion. The female locking member typically has a substantially U-shaped cross-section comprising a first leg which continuously extends from the body portion and a second flexible leg projecting upwardly from the body portion. Disposed within the U-shaped cross-section is a sealing means such as an elastomeric material which has the capability of conforming to the shape of the gap provided within the U-shaped cross-section once the male and female blocking members are connected. The leading portion of the second leg of the female locking member can be provided with a chamfer which allows a tool to pry the second leg open allowing the male member to be disconnected therefrom.

The protective sleeve can be extruded in a tubular form having a female locking member projecting therefrom. When the protective sleeve is extruded in this form, the sleeve is slit open longitudinally and the object or objects to be protected are indented through the slit. Thereafter the edge of the sleeve most distal to the female locking member is inserted into the gap provided between the outer surface of the protective sleeve and inner wall of the female locking member. With the distal edge otherwise referred to herein as the male locking member, positioned within the female locking member, the male and female locking members are sealed together to protect the object or objects from the elements.

Additional objects and advantages of the present invention will become apparent from a reading of the detailed description of the preferred embodiments which make reference to the following set of drawings in which:

BRIEF DESCRIPTION OF THE PREFERRED EMBODIMENTS

Figure 1:
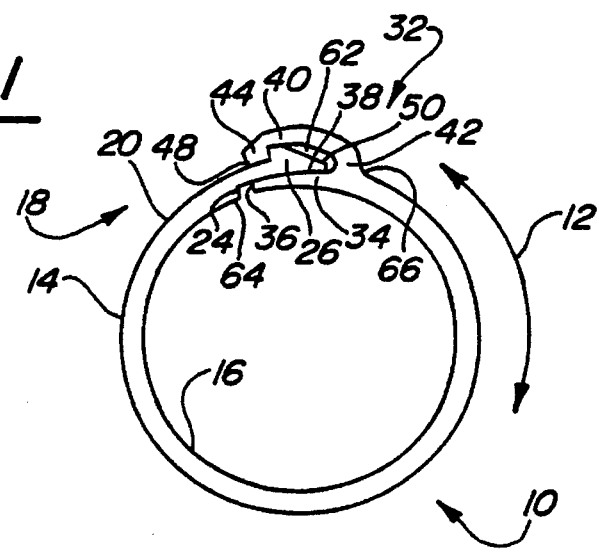
FIG. 1 is a cross-sectional end view of the present invention shown in a locked position.

Referring to FIG. 1, a cross-sectional end view of the sleeve assembly 10 of the present invention is generally comprised of a longitudinal body portion 12 and male and female locking members 18 and 32, respectively, extending from the body portion 12 at first and second longitudinal edges. The sleeve assembly 10 is typically formed of extruded plastic and can extend essentially to any length necessary. The embodiment of FIG. 1 has an overall round cross-section, although it will be understood that other overall shapes are possible. Initially, the protective sleeve assembly 10 is formed and the male and female locking members 18 and 32 are connected for shipping purposes. The male locking member 18 which extends from the body portion 12 at a first longitudinal edge 64 has a width which is thinner than that of the body portion 12. While the outer surface 20 of the male locking member 18 is a continuation of the outer surface 14 of the body portion 12, the inner surface 22 is formed with a step 24 which gives the male locking member 18 a reduced thickness. Extending outwardly from the outer surface 20 of the male locking member 18 is a longitudinal flange 26 which, upon connection, locks into the female locking member 32. The flange 26 is provided with a blocking wall 28 at its trailing end and a downwardly tapering lead-in portion 30. The downwardly tapering leading portion 30 assists in the insertion of the male locking member 18 into the female locking member 32.

The female locking member 32 which extends longitudinally from a second longitudinal edge 66 of the body portion 12 has a U-shape in cross-section. The female locking member 32 has a first leg 34 which is a continuation of the body portion 12 and a second L-shaped leg 40 which projects upwardly from the body portion 12. The inner surface of the first leg 34 is essentially a smooth continuation of the inner surface 16 of the body portion 12. The first leg 34 typically is about half as thick as the body portion 12 to accommodate for the thickness of the substantially overlapping male locking member 18. The second substantially L-shaped leg 40 flexes to receive male locking member 18. Point 42 is where the leg 40 projects up from the body portion 12. The first end of the leg 40 is provided with an inwardly projecting longitudinally flange 44. This flange 44 is provided with a first surface 46, as shown more clearly in FIG. 2, which abuts the blocking wall 28 of the male locking member 18 upon connection of the male and female locking members. Additionally, the first end of the inwardly projecting flange 44 is chamfered at point 48 to allow for the insertion of a tool which is used to pry the second leg 40 open to facilitate joining the male and female locking members together. As can be see in FIG. 1, a gap 50 is provided between the male locking member 18 and the female locking member 40 when the male locking member is engaged within the female locking member. There is a space between the step 24 and end of the first leg 34 of the female locking member.

Figure 2:
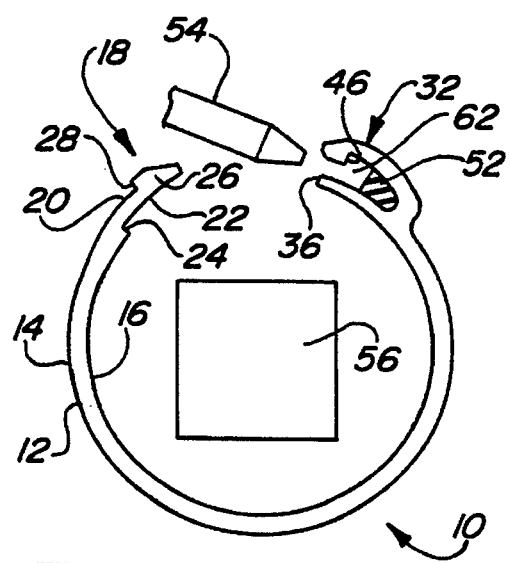
FIG. 2 is a cross-sectional end view of the present invention shown in a disengaged position with the sealing material inserted within the female locking member.

Referring to FIG. 2, a cross-sectional end view of the present invention is shown in a disengaged position with a sealing material 52 being inserted between the first and second legs 34 and 40, respectively. After the sleeve assembly 10 has been shipped, the male locking member 18 is withdrawn from the female locking member 32 by prying the second leg 40 open with a tool (not shown). A sealant dispenser 54 which typically has a tapered tip is inserted under the chamfered portion 48 of the second leg 40. Once the second leg has been flexed open about point 42, a sealing material is inserted. It is preferable that the sealing material be inserted just prior to locking the sleeve assembly 10 to contain the conducting equipment 56. Often because the sealing material is made from a deformable elastomeric material such as a non-hardening rubber, the sealing material will "cold flow", or shift, which will result in an imperfect seal if the sealing material is inserted too soon.

Figure 3:
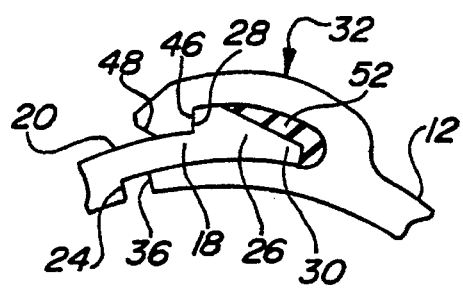
FIG. 3 is a cross-sectional end view of the present invention shown in a locked position with sealing material contained between the male and female locking members.

With the sealing material in place and the conducting equipment positioned within the sleeve assembly 10, the male locking member 18 is again inserted into the female locking member 32, as shown in FIG. 3. As a result of storing and shipping the protective sleeve in the closed position, the sleeve assembly tends to be easily closable after the sealing material has been positioned within the female locking member. The tapered lead-in portion 30 of the flange 26 forces the second leg 40 to flex open until the flange 26 passes by the inwardly projecting flange 44 and snap locks in behind blocking wall 46. The sealing material 52 is capable of conforming to the dimensions of gap 50 when the male locking member 18 is engaged within the female locking member, thereby filling gap 50.

Figure 4:
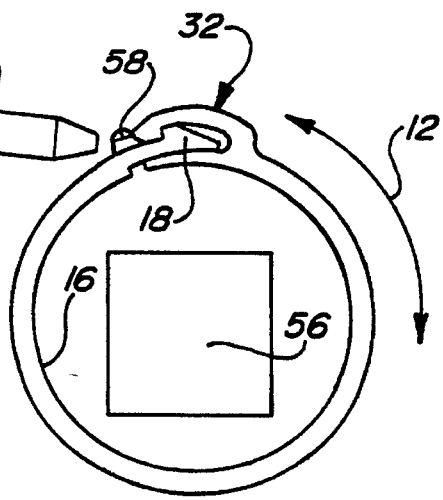
FIG. 4 is a cross-sectional end view of the present invention wherein the male and female locking members have been plastic welded together.

As shown in FIG. 4, it is contemplated that additional sealing can be accomplished by plastic welding the male and female locking members 18 and 32 together. Once the male and female locking members have been snap locked, additional plastic is provided at the point 58 which is contiguous with the leading end of second leg. The additional plastic is melted upon the male member which permanently seals the male locking member 18 within the female locking member 32.

Figure 5:
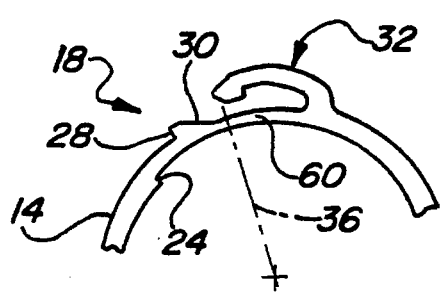
FIG. 5 is a cross sectional end view of the present invention wherein the protective sleeve is extruded as a tube.

The sleeve assembly can be extended in the disconnected position similar to the view in FIG. 2 or it can be extruded in a tubular manner as shown in FIG. 5. Extrusion in a tubular form is often desirable as this eliminates the possibility of contamination prior to inserting the object or objects to be protected and makes it easier to ship the protective sleeve. Again the protective sleeve has a female locking member 32 projecting outwardly from the outer surface 14. A severable web 60 is provided at the leading end of the male member 18 and leading end 36 of female member 32. To insert the object or objects, a slit is cut into the protective sleeve at the web 60 thereby separating the sleeve to provide the male and female locking members 18 and 32, respectively. The object or objects are inserted through the slit and the male member is inserted into the female member 32 to close the sleeve.

As demonstrated in FIG. 1, the male member 18 primarily becomes locked within the female member 32 as a result of the flange 44 abutting against the blocking wall 28. The seal can be further reinforced with glue or by arc welding the male and female locking members together and by providing a sealing material (not shown) in gap 62.

While the above description constitutes the preferred embodiments of the present invention, it will be appreciated that the invention is susceptible to modification, variation and change without departing from the proper scope and entire meaning of the accompanying claims. For example, it is contemplated that an adhesive can be applied between the male and female locking members to provide a permanent seal.

I claim:

1. An apparatus for protecting conducting equipment comprising:

a selectively closeble sleeve formed from a single piece of plastic having a longitudinal body portion which includes an inner surface, and outer surface, a male locking member and a mating female locking member;

said male locking member extending from said body portion wherein said male locking member has a reduced thickness providing a step, said male locking member having only a single flange which includes a blocking wall and a tapered wall adjoining said blocking wall;

said female locking member having a substantially U-shaped cross-section comprising a first leg having an inner surface and a second L-shaped flexible leg, said first leg extending to an end from said body portion wherein said inner surface of said first leg is substantially contiguous with the inner surface of said body portion and is thinner than said body portion, said second L-shaped flexible leg projecting from said body portion, only one of said legs of said female locking member having a flange pointing toward the other of said legs, said flange of said female locking member being provided with a first surface abutting said blocking wall during engagement width said male locking member wherein there is an unobstructed space between said end of said first leg and said step; and gap means provided within said U-shaped cross-section of said female locking member when said male locking member is engaged within said female locking member, said gap means including elastomeric sealing means which is deformable to substantially fill said gap means when said male locking member is connected with said female locking member;

whereby said male and female locking members are connected such that said male locking member overlaps said first leg of said female locking member to provide a closed sleeve.

2. The apparatus as claimed in claim 1, wherein said male and female locking members are plastic welded together.

3. The apparatus as claimed in claim 1, wherein a first end of said second leg is chamfered.

* * * * *

UNITED STATES PATENT AND TRADEMARK OFFICE
CERTIFICATE OF CORRECTION

PATENT NO. : 5,505,230
DATED : April 9, 1996
INVENTOR(S) : Donald D. Bartholomew It is certified that error appears in the above-indentified patent and that said Letters Patent is hereby corrected as shown below:

Col. 1, Line 30, "emended" should be --extended--

Col. 1, Line 39, before "object" insert --the--

Col. 3, Line 22, "leading" should be --lead-in--

Col. 3, Line 47, "see" should be --seen--

Col. 4, Line 60, Claim 1, "closeble" should be --closeable--

Col. 4, Line 62, Claim 1, "and" should be --an--

Col. 5, Line 15, Claim 1, "width" should be --with--

Signed and Sealed this

Third Day of September, 1996

Attest:

BRUCE LEHMAN

Attesting Officer

Commissioner of Patents and Trademarks